Dec. 20, 1966          J. L. CRAWFORD ETAL          3,293,469
                         ELECTRICAL ALTERNATOR
Filed Jan. 28, 1964                                2 Sheets-Sheet 1
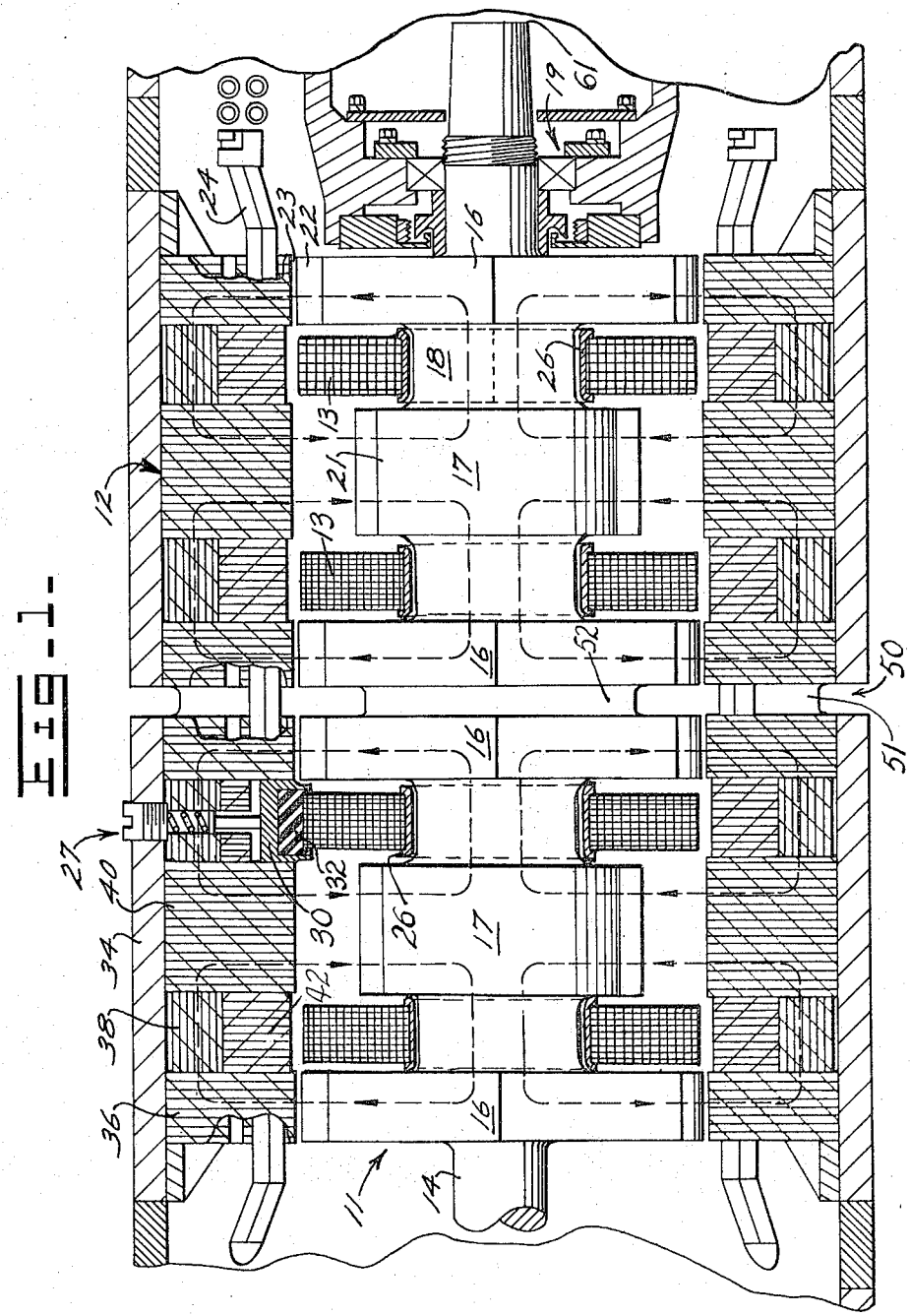
INVENTORS
JAMES L. CRAWFORD
PAUL J. STAEBLER
BY
*Fryer and Grimwald*
ATTORNEYS

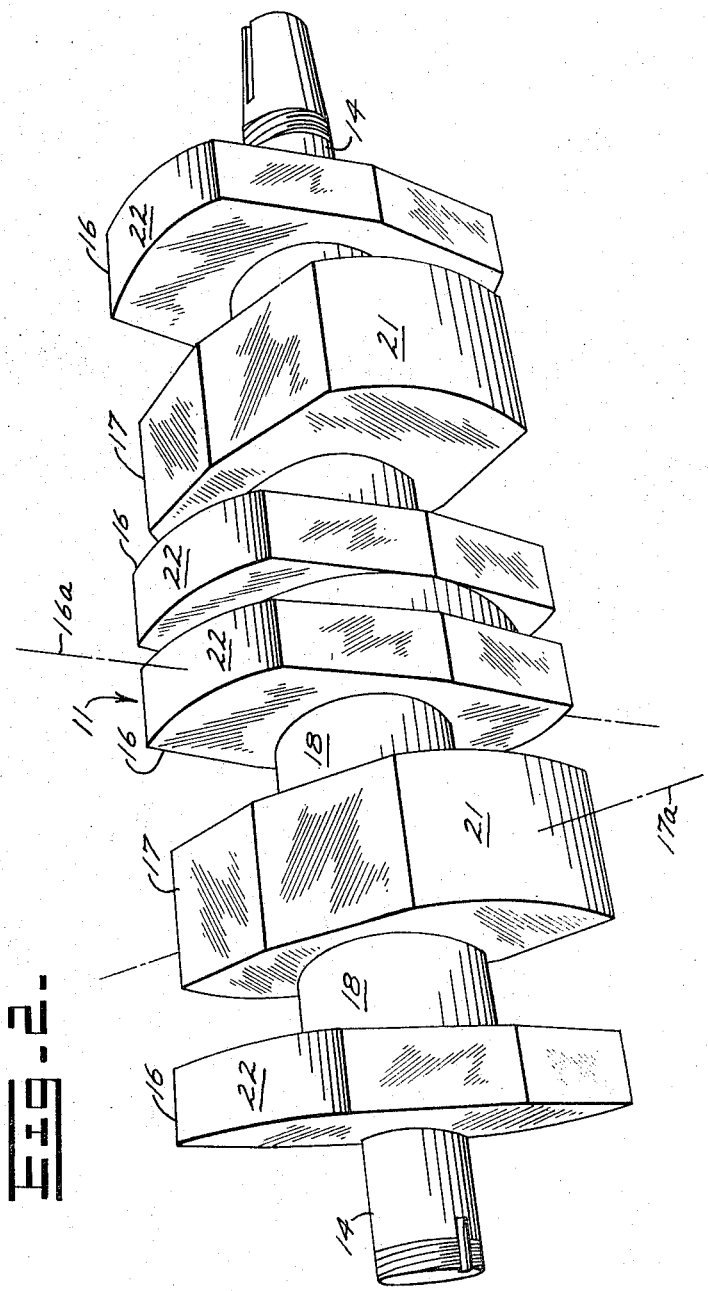

United States Patent Office 3,293,469
Patented Dec. 20, 1966

3,293,469
ELECTRICAL ALTERNATOR
James L. Crawford, Chillicothe, and Paul J. Staebler, Peoria, Ill., assignors to Caterpillar Tractor Co., Peoria, Ill., a corporation of California
Filed Jan. 28, 1964, Ser. No. 340,683
6 Claims. (Cl. 310—168)

The present invention relates to electrical alternators and more particularly to an improved alternator with a solid, multiple pole rotor and multiple, stationary field coils.

Present trends in the design of power plants for large earth moving equipment is toward electric drive vehicles powered by gas turbine engines. These vehicles employ gas turbine engines to drive A.C. generators which in turn provide electrical energy to electric motors which operate to drive the vehicle wheels or tracks. Since gas turbine engines are characteristically high speed devices it is necessary for the A.C. generator which links the gas turbine engine to the electric drive motors to be capable of very high speed operation (e.g. 12,000 r.p.m.). It has been found that for one reason or another (as pointed out in detail below) electrical generators as presently known in the art are not suitable for electric drive vehicle systems which must operate at such high speeds.

Salient pole rotors employ field windings wound parallel to the axis of, and carried on, the rotor shaft around soft iron pole pieces. These rotors are not suitable for high speed applications because of the difficulty in retaining the pole pieces and field windings against high centrifugal forces. In addition, the diameter of these rotors must necessarily be large to accommodate the field windings. Cylindrical rotors which are similar in appearance to the rotating armature of a D.C. generator are prohibitively expensive since coils and coil ends must be banded to retain them at high speeds and rotors must be hand wound by highly skilled technicians. Inductor type alternators use axially slotted rotors with no windings, thereby lending themselves very well to high speed operation. These alternators, however, produce only half wave voltage so that for a given output approximately twice the material is required as compared to other types of alternators. This naturally imposes such a severe size and weight penalty on this type of alternator as to make it non-acceptable. An alternator design which comes the closest to fulfilling the requirements of an electric drive system is commonly referred to as a Lundell type alternator. This type of unit uses a steel core concentric with the shaft, a field coil wound about the core, and a rotor segment at either end of the core. The field coil magnetizes the two rotor pole segments which are mounted on the shaft adjacent to opposite sides of the coil. Thus, one segment becomes a south pole and the other a north pole. These segments have fingers extending parallel to the shaft and over the field coil. The fingers of each segment extend between those of the other segment forming alternate north and south poles around the rotor periphery. A variation of this design employs a stationary field winding inserted in the hollow end of a cantilevered rotor constructed similarly to the one described above. This eliminates the need for brushes to supply field current. The inherent disadvantages of this design, however, which make it unacceptable for use with a gas turbine in an electric drive vehicle are: (a) it is limited to a maximum of one field coil which limits the possible field strength, (b) it is a single flux path device, and (c) it requires a relatively large diameter for a given output.

The present invention is designed to provide an alternator which supplies electric energy to vehicle drive motors wherein the unique design and methods for manufacture of this alternator eliminates the limiting disadvantages inherent in alternators presently known in the art.

Accordingly, it is an object of the present invention to provide an alternator for an electric drive system wherein the alternator is capable of operating at speeds of 12,000 r.p.m. so as to make it compatible with gas turbine prime movers.

It is a further object of the present invention to provide an alternator having a solid, multiple pole rotor with multiple stationary field coils so as to provide the maximum output for the size and weight of the material employed.

It is a further object of the present invention to provide a unique arrangement of stator laminations for the subject alternator to improve the operating characteristics of the unit.

Further and more specific advantages and objects of the present invention are made apparent in the following specification wherein a preferred form of the invention is described by reference to the accompanying drawings.

In the drawings:

FIG. 1 is a sectional illustration of the alternator of the present invention, with some portions broken away and others not shown to eliminate superfluous matter; and FIG. 2 is an isometric illustration of the rotor shown in FIG. 1.

The illustration of the subject alternator in FIG. 1 does not include the rotating member support details since a standard bearing and end bell configuration can be employed and are not part of the present invention. For the same reason, stator winding details have been omitted since a conventional three phase winding connected either in a "delta" or "Y" can be employed. Thus, with the details of the above mentioned portions of the alternator eliminated the novel features of the invention are clearly seen to reside in the rotor 11, stator laminations 12, and field windings 13.

The rotor 11 is machined from a single piece of material and includes a shaft 14, pole pieces 16, pole pieces 17, and a reduced diameter core portion 18. Shaft 14 is shown as being supported in suitable bearing structure generally indicated at 19. The pole pieces 16 and 17, as best seen in FIG. 2, are all approximately elliptical in shape so as to have a major axis (16a and 17a), and so disposed as to have a pair of separate pole pieces 16 for every pole piece 17. Each pole piece 17 has a pole piece 16 longitudinally adjacent to it on both of its sides. Between each pole piece 17 and its adjacent pole pieces 16 the rotor 11 has a reduced diameter portion 18 with field windings 13 disposed circumjacent thereto. The field windings 13 are energized from a standard D.C. supply (not shown) and so oriented as to establish an electrical polarity on the faces 21 of the pole pieces 17 which is opposite to the polarity established on the faces 22 of the pole pieces 16 adjacent to the pole pieces 17.

With this arrangement of components flux is established in the rotor 11 and travels from the faces 22 of pole pieces 16 through air gap 23 into the laminations 12 of the stator and then back to the rotor 11 after crossing another air gap and entering the face 21 of pole piece 17. The stator windings 24 are disposed in the laminations 12 such that the flux which passes through the stator in going from pole piece 16 to pole piece 17 cuts through the stator windings.

The major axis 16a of each pole piece 16 (the axis which passes through the pole piece faces) is angularly disposed approximately 90° from the major axis 17a of each pole piece 17 (the major axis passing through the faces 21 of pole pieces 17) so that as the flux passes from face 22 of pole piece 16 to face 21 of pole piece 17 it moves an equal number of degrees around the stator 12. Since the polarity of pole pieces 16 is opposite to that of pole pieces 17 and pole pieces 16 and 17 are circumferentially disposed by an angle of approximately 90°, the stator 12 sees alternate polarities for each such increment of circumferential travel (the portions of the pole pieces not on the ends of the major axes being separated from the stator by such a large air gap as to have no influence thereon). Thus, in operation as the rotor 11 rotates the stator windings 24 see alternate north and south poles causing repeated flux changes within the stator windings which induce an electric current to flow therein.

The major axes 16a and 17a of pole pieces 16 and 17 are shown in FIG. 2 and described as being angularly disposed approximately 90° from each other. To prevent harmonic frequencies in the generator wave form, each pole piece (the two center pole pieces 16 being considered as one) is consecutively displaced an equal number of degrees which is either consistently 90° plus a slight amount or 90° minus a slight amount. Referring to FIG. 2 and using axis 16a (not shown) of pole piece 16 on the extreme right end as reference, and assuming each pole piece is displaced an equal 90° plus a slight amount, then axis 17a (not shown) of right pole piece 17 is displaced 90° plus a slight amount from reference. Thereafter each pole piece is displaced the identical 90° plus a slight amount from its neighbor with the proviso that the two center pole pieces 16 are considered as one pole piece. Axes 16a of these two center pole pieces are parallel. Alternatively, each pole piece could be displaced an equal angle of 90° minus a slight amount from its neighbor again, with the same proviso.

Each of the field windings 13 is mounted on a support member 26 which surrounds the rotor 11 at the reduced diameter portions between pole pieces 16 and 17. The support members 26 are slightly larger in diameter than the portion of the rotor which they surround which enables the rotor to move without interference from the field windings. The field windings are held in place by any suitable means such as that illustrated generally at 27. The field windings clamping assemblies 27 may include a metal block 30 to provide strength with an insulated lining 32 to prevent short circuits and other undesired current paths. The particular manner selected for clamping the field windings 13 in place is not critical to the invention at hand. Consequently only one clamping assembly 27 is shown in FIG. 1 but it will be understood that each field winding is held in place by identical assemblies. In the present embodiment there are three clamping assemblies 27 associated with each field winding. They are spaced at 120° intervals about the frame and are axially aligned.

Four types of assemblied lamination stacks are employed and pressed into the alternator frame 34 in a configuration shown in FIG. 1. Lamination stacks 36 and 40 are made up of identical, radially disposed, punched laminations. Lamination stack 38 is toroidal in configuration and is located so that individual laminations extend longitudinally of the rotor 11 and perpendicular to lamination stacks 36 and 40. Lamination stack 42 is also made up of radially disposed, punched laminations. The arrangement of lamination stacks as shown enhances the magnetic characteristics of the subject alternator by providing a low reluctance path for the alternator field and minimizing eddy currents in reducing the flux path lengths where magnetic lines of force pass perpendicular to laminations. With the configuration of components as shown, magnetic lines of force must travel from a north pole through the stator laminations and return to a south pole. In all cases, where possible, the magnetic lines of force will travel the path of least reluctance which is the iron of the stator lamination. However, to complete the flux path magnetic lines of force must travel longitudinally through and perpendicular to radially disposed laminations at some point in the magnetic circuit. The reluctance of this magnetic circuit is increased each time the lines of force are made to travel through an air gap and insulation area in going from the iron of one lamination to the iron of the next. Employment of toroidal lamination stacks 38 in the area where flux would normally be perpendicular to laminations in a conventional configuration, eliminates approximately 125 air gap and insulation areas in the flux path for each pair of poles. Thus, by the novel arrangement of stator laminations described above the reluctance of the path which the flux must follow is greatly reduced so as to enhance the operating characteristics of the alternator.

An opening 50 in the alternator frame 34 registers with air slot 51 and reduced rotor portion 52 between the two center pole pieces 16. Although not necessary to an understanding of the present invention, it will be understood that forced air cooling may be admitted to the interior of the frame by means of a series of openings 50 and air slots 51 located about the periphery of the frame. It will be understood that the two center pole pieces 16 will function equally well magnetically if they are not separated by reduced portion 52. Reduced portion 52 offers an adequate forced air path, and if cooling is not desired, the present rotor structure of FIG. 1 could be shortened by the width of reduced portion 52 so that the two center pole pieces 16 would be continuous.

It will be understood that while the present embodiment of the invention has been described as consisting of two 16–17–16 pole piece sections, other embodiments of the invention may consist of additional identical sections. Also the invention could be embodied in a single 16–17–16 pole piece section. The effect would be to either increase or decrease the number of flux paths intersecting the stator windings thus changing the voltage and power available from the alternator.

Referring to FIG. 1 for purposes of explaining the addition of one more 16–17–16 rotor section to the two sections shown, shaft extremity 61 would be relocated in that case by an amount equal to the width of an additional 16–17–16 section which would be located with the first additional pole piece 16 adjacent the pole piece 16 presently shown at the extreme right end of FIG. 1 and separated by a reduced core portion 52.

We claim:
1. In a rotor for an electric generator the combination comprising:
    a cylindrical rotor core; and
    a plurality of pole pieces approximately elliptical in shape so as to have a major axis, said pole pieces disposed at spaced apart locations on said core with their major axes generally perpendicular to the longitudinal axis of said core;
    said pole pieces including at least one first pole piece;
    said pole pieces including second pole pieces wherein a pair of said second pole pieces is disposed on opposite sides of a first pole piece and oriented to have their major axes generally perpendicular to the major axes of said first pole pieces.

2. The rotor of claim 1 wherein said core, first pole piece, and second pole pieces are all formed from a single solid piece of material which is machined to the required configuration.

3. In a rotor for an electric generator the combination comprising:
    a cylindrical rotor core; and
    a plurality of pole pieces approximately elliptical in shape so as to have a major axis, said pole pieces disposed at spaced apart locations on said core with their major axes generally perpendicular to the longitudinal axis of said core;
    said pole pieces including a plurality of first pole pieces all having their major axes generally parallel to each other;
    said pole pieces including second pole pieces wherein each first pole piece has a pair of second pole pieces associated therewith and disposed on either side thereof, said second pole pieces having their axes generally parallel to one another and generally perpendicular to the major axes of said first pole pieces, said rotor core, first pole pieces, and second pole pieces all being formed from a single piece of material to enable the rotor to be operated at high speeds.

4. In an electric generator the combination comprising:
a generally cylindrical rotor core;
a plurality of pole pieces disposed at spaced apart locations along the longitudinal axis of said core, wherein said pole pieces are approximately elliptical in shape to have a major axis;
said pole pieces including first pole pieces said first pole pieces all having their axes generally parallel to one another;
said pole pieces including second pole pieces said second pole pieces all having their major axes generally parallel to one another and generally perpendicular to the axes of said first pole pieces, each of said first pole pieces associated with a discrete pair of said second pole pieces wherein said second pole pieces are disposed on either side of each of said first pole piece;
a generally toroidal field coil disposed about said core at each space between a first and second pole piece, said field coils held stationary with respect to said rotor and oriented to magnetically polarize said pole pieces such that the polarity of said first pole pieces is opposite to the polarity of its associated second pole pieces.

5. The electric generator of claim 4 further comprising:
a generally cylindrical stator surrounding said rotor and associated field windings, said stator including first radially oriented lamination sections radially adjacent to each of said first and second pole pieces, second radially oriented laminations adjacent to said field windings, wherein said second laminations extend radially a distance less than said first laminations, and longitudinally extending laminations disposed circumjacent to said second laminations.

6. In a cylindrical shaped stator for an electric generator the combination comprising:
toroidal shaped, longitudinally extending laminations; and
radially extending laminations, wherein said radially extending laminations surround said toroidal laminations along three sides including its longitudinal extremities and its radial interior.

References Cited by the Examiner

UNITED STATES PATENTS

| | | | |
|---|---|---|---|
| 588,602 | 8/1897 | Rice | 310—263 X |
| 2,108,662 | 2/1938 | Fisher | 310—168 |
| 2,243,318 | 5/1941 | Rawlings | 310—254 |
| 2,796,542 | 6/1957 | Bekey et al. | 310—168 |
| 3,132,269 | 5/1964 | Craske | 310—168 |
| 3,223,866 | 12/1965 | Tiltins | 310—168 |

MILTON O. HIRSHFIELD, *Primary Examiner.*

L. L. SMITH, *Assistant Examiner.*